May 12, 1931. W. B. GRIFFITH 1,805,241
DRY PIPE VALVE
Filed Sept. 23, 1926 2 Sheets-Sheet 1

Inventor:
William B. Griffith
By F. DeWitt Goodwin
Attorney

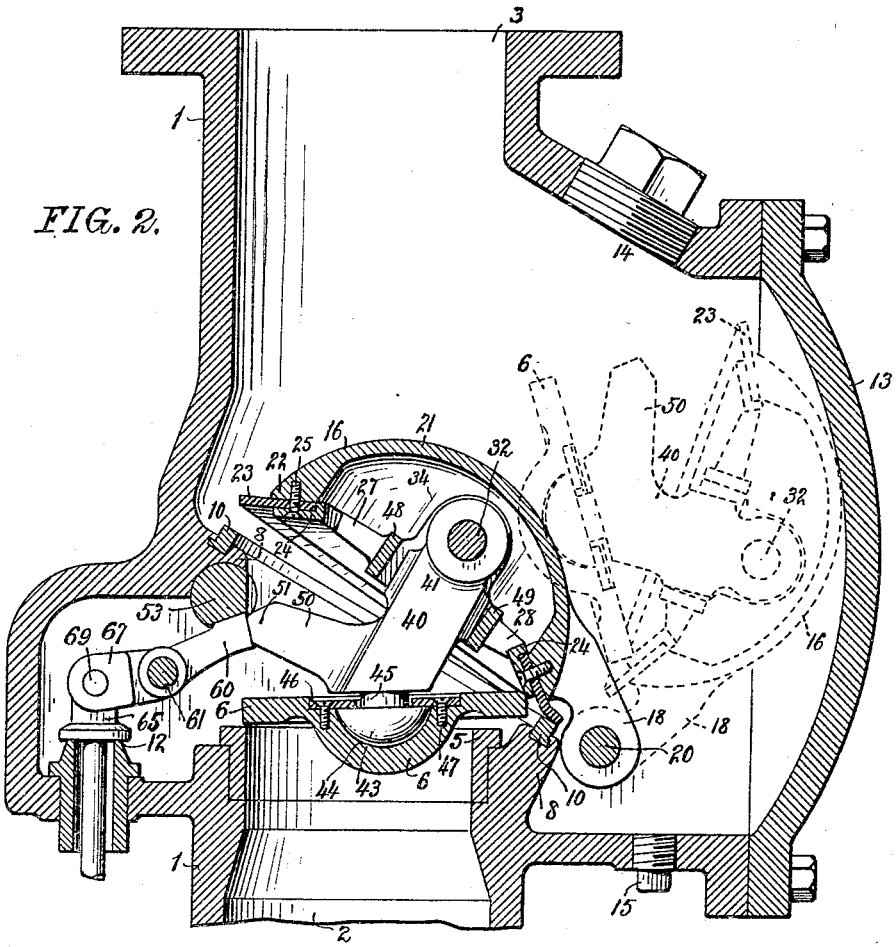

Patented May 12, 1931

1,805,241

UNITED STATES PATENT OFFICE

WILLIAM B. GRIFFITH, OF AUDUBON, NEW JERSEY, ASSIGNOR TO STAR SPRINKLER CORPORATION, A CORPORATION OF NEW JERSEY

DRY PIPE VALVE

Application filed September 23, 1926. Serial No. 137,218.

My invention relates to improvements in dry pipe valves adapted for use in sprinkler systems. Valves of this type comprise a water valve and an air valve of larger area than the water valve, whereby a low air pressure confined in the system and acting upon the air valve will hold the water valve closed against a higher water pressure. Valves of this type are well known in the art.

The object of my invention is to provide lever mechanism between the air and water valves for increasing the effective force exerted by the air valve upon the water valve thus permitting the area of the air valve to be reduced relatively to the size of the water valve and permitting a general reduction in the size of the dry pipe valve; a further object of my invention is to provide novel means for preventing the reseating of the valves after they have started to open; and a still further object of my invention is to provide a novel means for positively controlling the drip valve forming part of the dry pipe valve.

Figure 1:
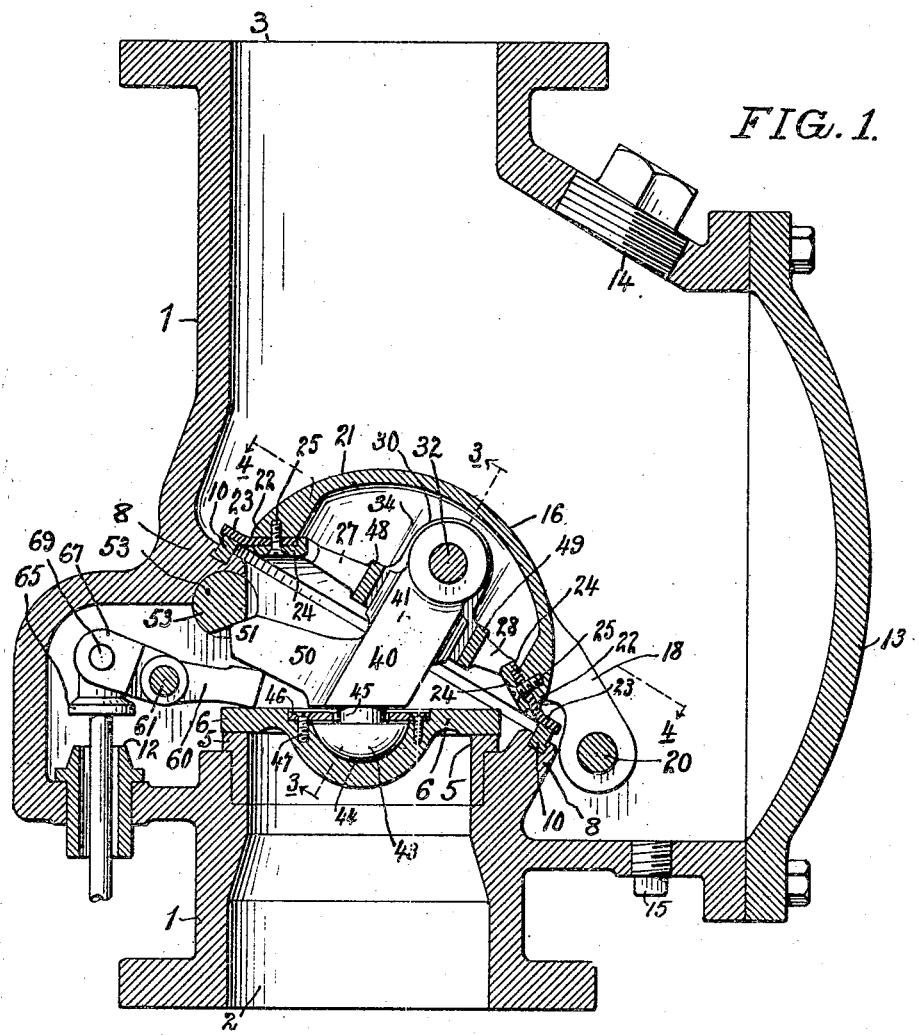
Figure 3:
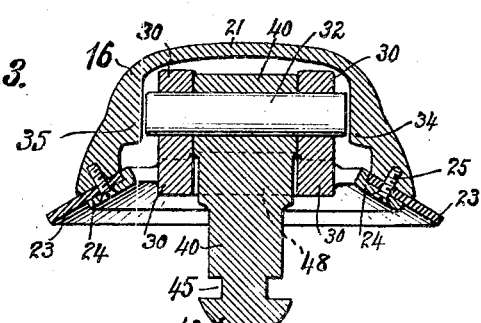

Referring to the accompanying drawings, Fig. 1, is a central vertical sectional view of my improved dry pipe valve, showing the valve clapper in the closed position; Fig. 2, is a view similar to Fig. 1, showing the clapper in the partially opened position in full lines and in the full opened position in dotted lines; Fig. 3, is a partial transverse sectional view on the line 3—3 Fig. 1; Fig. 4 is a horizontal sectional view on line 4—4 Fig. 1; and Fig. 5, is a detached sectional plan view of the clamp ring and bearing member shown in Fig. 4.

In the drawings, in which like reference characters refer to like parts, 1 represents the body or casing of the dry pipe valve having an inlet pipe 2 and an outlet pipe 3. Said inlet pipe is provided with a water valve seat 5, located within the casing and adapted to be closed by a water valve 6. Said casing is provided with a flange 8 on which is mounted the air valve seat 10 which is positioned in an oblique plane relatively to the water valve seat 6, which latter is positioned in a horizontal plane. The casing 1 is also provided with a drip valve seat 12 and the usual removable side plate 13 and plugs 14 and 15.

The valve clapper 16 is mounted upon a rigid frame, or arms 18, which are pivotally mounted upon a shaft 20 having its ends supported upon the casing 1 in any suitable manner, and upon which shaft the clapper 16 is adapted to swing into the open and closed positions, as shown in Figs. 1 and 2.

The clapper 16 consists of a hollow dome shaped body 21, provided with an annular flange 22 having a facing surface upon its under edge to which is secured the air valve 23, by a clamp-ring 24, which is secured to the flange 22, by fastening devices 25, whereby the flexible air valve 23 may rest upon the seat 10 and close the latter.

The clamp-ring 24 forms a means for carrying the water valve 6, which is adapted to rest upon and close the water valve seat 5. The clamp-ring 24 is provided with arms or webs 27 and 28 which support the bearings 30, in which a shaft 32 is loosely mounted. Said bearings 30 extend from the plane of the webs 27 and 28 into the hollow portion of the dome shaped body 21 of the clapper 16, but are not secured to said body 21 otherwise than by the clamp-ring 24. The longitudinal movement of said shaft 32 is limited by the bosses 34 and 35 forming vertical walls within said body 21.

A lever 40 is pivotally mounted at one end 41 thereof upon said shaft 32 carried by the clapper 16. Said lever 40 carries the water valve 6, which latter swings into the open and closed positions with the clapper 16. The lever 40 is provided with a hemispherical bearing head 43 which fits loosely into a socket 44 of similar shape formed in the center of the valve 6. At the base of the head 43 is an annular groove 45, into which extends the inner edge of a split collar 46 which is secured to the valve 6 by fastening devices 47. A slight rocking movement of the valve 6, in relation to the lever 40 is permitted by the loosely fitting collar 46. The movement of the lever 40 about the shaft 32 is limited by stop plates 48 and 49 upon the central web portion of the clamp-ring 24. The loose construction of the connections between the lever 40 and the clapper 16 and the water valve 6, permits a downward pressure upon the clapper 16 to be imparted through the lever 40 to the water valve 6 thus holding the latter upon its seat 5.

The lever 40 is provided with an arm 50 which extends nearly at right angles to the line between the shaft 32 and the bearing head 43. The outer end 51 of said arm 50 is adapted to engage a part 53, secured in the casing 1, which forms a stop against which the arm 50 is fulcrumed. When the clapper 16 is in the closed position, as shown in Fig. 1, the lever 40 acts as a bell-crank-lever, having its fulcrum against the fixed stop 53, so that the downward pressure of the clapper 16 will exert an increased force upon the water valve 6, due to the arrangement of the lever 40. Said lever 40 acts as a strut between the shaft 32 and the bearing head 43, which strut is positioned at an oblique angle to the plane of the water valve 6, when closed upon its seat 5, thus tending to force the water valve towards its seat and also tending to slide the valve 6 away from the shaft 20. Said sliding movement of the valve 6 is resisted by the arm 50 which forms a strut positioned at an oblique angle to the valve 6 and inclined towards the stop 53 abutting said stop, so that the strut arm 50 and the stop 53 will take a large part of the force exerted by the water pressure against the under side of the water valve 6 and reduce the action of said force of said water pressure against the clapper 16.

The work exerted by the air pressure upon the upper side of the clapper 16 is applied to the end 41 of the lever 40, through the shaft 32, and the work done by the lever 40 at the bearing head 43 will be greater than the work applied to the end 41 of the lever 40 by the clapper 16, as the bearing head 43 is positioned between the shaft 32 of the clapper and the fixed fulcrum stop 53 on the casing.

A further gain in leverage is obtained by positioning the shaft 32 slightly closer to the pivot shaft 20 of the clapper 16 than it would be if located on a plane perpendicular to the center of the circular air valve 23. The supporting webs 27 of the clamp-ring are longer than the webs 28, as shown in Figs. 1, 4 and 5, thus reducing the distance between the fulcrum shaft 20 and the line of force extending between the shaft 32 and the bearing head 43 of the lever 40, relatively to the center of the air valve 23.

By arranging the lever 40, as above described, a given air pressure above the air valve 23 and clapper 16, will hold the water valve 6 upon its seat against a much greater pressure acting against the under side of said valve 6.

The valves 6 and 23 and the clapper 16 will be moved into the open position, as shown in Fig. 2, by the action of the water pressure below the water valve 6, when the air pressure in the system is reduced and the air valve 23 is relieved from the air pressure which has been holding it upon its seat 10. In the opening movement of the clapper 16, the water pressure lifts the water valve 6, which lifting movement of the valve 6 causes the lever 40 to impart a lifting movement to the shaft 32, thus tending to swing the clapper 16 about the shaft 20. The first swinging movement of the clapper causes the end 51 of the lever arm 50 to slide from under the fulcrum stop 53. When the arm 50 is free from said stop 53, the clapper 16 will be forced about the shaft 20, into the open position, carrying with it the air valve 23, the lever 40 and the water valve 6, as shown in dotted lines Fig. 2.

An arm 60 is pivotally mounted upon a shaft 61 secured in the casing 1. The free end of said arm 60 is positioned between the upper side of the water valve 6 and the under side of the lever arm 50, when the valves and clapper are in the closed position, as shown in Fig. 1. The opening movement of the water valve 6 exerts a positive action against the arm 60 and moves the latter about the shaft 61 and forces the end of the arm 60 against the stop 53, as shown in Fig. 2. The water valve 6 may swing free from under the end of the arm 60 and be carried into the open position, after the valve 6 has forced the arm 60 against the stop 53.

If the clapper 16 should not move into the full open position but return towards the closed position, the arm 60 will prevent the water valve 6 and also the air valve 23 from reseating; due to said arm 60 occupying a position, as shown in Fig. 2, in the return path of the end 51 of the arm 50 on the lever 40, making it impossible for the valves 6 and 23 to close upon their seats.

Fig. 2 shows the clapper in full lines with the valves 6 and 23 held in the partially open position. In this position the arm 60 and the lever 40 act as toggle levers with the arm 60 forced against the stop 53 and the shaft 61, and the lever 40 forced against the shaft 32, or the stop plate 49, of the clapper 16, which latter communicates the force to the pivot shaft 20 fixed in the casing, thus insuring the air valve 23 and the water valve 6 being held off their respective seats.

A drip valve 65 is located within the casing 1 and is normally held off the drip-valve seat 12, by a lever arm 67 forming part of the arm 60, above described. The drip valve 65 is loosely pivoted to the lever arm 67 by a pin 69. When the water valve 6 is closed the drip valve 65 is held in the open position, as shown in Fig. 1 and when the water valve 6 is moved off its seat the arm 60 is moved by a positive force into a position which will force the drip valve 65 into the closed position as shown in Fig. 2. The weight of the drip valve 65 will tend to hold it in the closed position and also hold the arm 60 against the block 53 but the weight of the parts cannot be depended upon to move the drip valve and the arm 60 as they may stick due to corrosion; by my improved construction a positive movement of the parts is insured.

I claim:

1. A dry pipe valve comprising a casing having an air valve seat and a water valve seat formed therein, a clapper pivoted upon the casing, an air valve, a clamp-ring secured to the clapper adapted for holding the air valve upon the clapper, a bearing mounted upon said clamp-ring, a shaft in said bearing, a lever having one end pivoted upon said shaft, a water valve pivotally mounted upon said lever, a part upon the casing forming a stop, and an arm fixed to the lever adapted to engage said stop when the water valve is in the closed position upon the water valve seat.

2. A dry pipe valve having an air valve seat and a water valve seat formed therein, a clapper pivoted upon the casing, said clapper having a hollow hemispherical body thereon, an air valve, a clamp-ring adapted for securing the air valve to said body, a bearing upon said clamp-ring located within said body, a lever pivotally mounted in said bearing, and a water valve pivotally secured to said lever adapted to be moved into the open and closed positions with said clapper relatively to the valve seats.

3. A dry pipe valve comprising a casing having an air valve seat formed therein, a water valve seat located in the casing in a different plane from the air valve seat, a clapper pivoted within the casing, an air valve upon the clapper adapted to close upon the air valve seat, a member pivotally mounted on the clapper, a stop upon the clapper located in the path of said pivoted member, a water valve pivoted upon said member, an arm pivoted upon the casing having its free end located between the water valve and said member when the water valve is closed upon its seat, and said arm adapted to be moved by the water valve into a position to engage said member upon a return movement of the latter towards the water valve seat and move said member against said stop to prevent the water valve from reseating.

4. A dry pipe valve comprising a casing having an air valve seat formed therein, a water valve seat located in the casing in a different plane from the air valve seat, a clapper pivoted within the casing, an air valve upon the clapper adapted to close upon the air valve seat, a lever having one end pivoted upon the clapper, a stop upon the clapper located in the path of said lever to limit the swinging movement of the lever relatively to the clapper, a water valve pivotally mounted upon said lever, an arm rigidly fixed to said lever, a part upon the casing forming a stop against which said arm abuts when the water valve is upon the water valve seat, an arm pivoted upon the casing having its free end located between the water valve and the arm upon the lever adapted to be moved against said stop by the opening movement of the water valve and occupy a position in the return path of the end of the arm upon said lever whereby said arms will abut endwise and move the lever against the stop on the clapper and prevent the reseating of the water valve.

In testimony whereof I affix my signature.

WILLIAM B. GRIFFITH.